United States Patent Office 3,501,478
Patented Mar. 17, 1970

3,501,478
8-BENZYLOXY - 7 - METHOXY-2-METHYL-1,2,3,4 - TETRAHYDROISOQUINOLINES AND INTERMEDIATES
Guenter Grethe, Cedar Grove, and Fausto Eugenio Schenker, Bloomfield, N.J., assignors to Hoffmann-La Roche Inc., Nutley, N.J., a corporation of New Jersey
No Drawing. Filed Mar. 29, 1967, Ser. No. 626,695
Int. Cl. A61k 27/00; C07d 5/10
U.S. Cl. 260—286          8 Claims

ABSTRACT OF THE DISCLOSURE

The preparation of novel hypotensives, i.e., 8-benzyloxy - 7 - methoxy-2 - methyl - 1,2,3,4 - tetrahydroisoquinoline and 8-benzyloxy-6,7-dimethoxy-2-methyl-1,2,3,4-isoquinoline, is disclosed utilizing as intermediates the corresponding novel 8-hydroxy and 8-benzyloxy-2-formyl-7-methoxy-1,2,3,4-tetrahydroisoquinolines, and 8-hydroxy and 8 - benzyloxy - 2 - formyl - 6,7 - dimethoxy - 1,2,3,4 - tetrahydroisoquinolines.

BRIEF SUMMARY OF THE INVENTION

The invention relates to novel hypotensive compounds of the formula

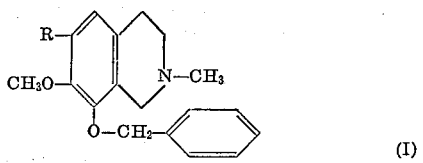

(I)

wherein R is selected from the group consisting of hydrogen and methoxy, and pharmaceutically acceptable acid addition salts thereof.

In another aspect, the invention relates to novel intermediates of the formula

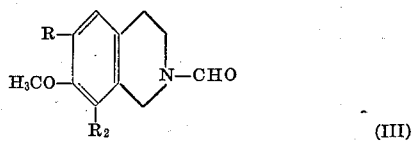

(III)

wherein R is as described above, and $R_2$ is selected from the group consisting of hydroxy and benzyloxy.

DETAILED DESCRIPTION

The novel compounds of the present invention and a process for the production thereof can be illustratively represented by the following formulas:

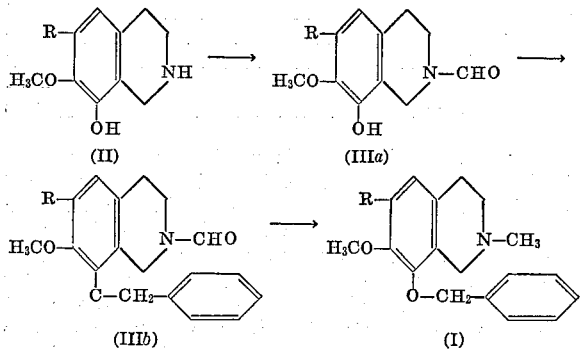

wherein R is selected from the group consisting of hydrogen and methoxy. The pharmaceutically acceptable acid addition salts of the compounds of Formula I are also within the scope of this invention.

The compounds encompassed by Formula I are: 8-benzyloxy - 7 - methoxy - 2 - methyl - 1,2,3,4 - tetrahydroisoquinoline and 8 - benzyloxy - 6,7 - dimethoxy - 2 - methyl-1,2,3,4-tetrahydroisoquinoline. Our invention, respecting the former compound, has in part been described in the publication by Grethe et al., Tetrahedron Letters No. 15, 1599–1603, April 1966. The novel compounds of Formula I and their pharmaceutically acceptable acid addition salts are useful as hypotensives. Additionally, 8-benzyloxy - 6,7 - dimethoxy - 2 - methyl - 1,2,3,4 - tetrahydroisoquinoline is useful as an antihistaminic and as an antiadrenergic, and 8 - benzyloxy - 7 - methoxy - 2 - methyl-1,2,3,4-tetrahydroisoquinoline is useful as a sympatholytic agent.

In carrying out the process of the invention, a selected compound of Formula II is reacted with formic acid in the presence of a trialkyl amine, such as triethylamine. The resulting aldehyde of Formula IIIa is reacted with an alkali metal alkoxide, such as sodium ethoxide, and subsequently reacted with a benzyl halide, such as benzyl chloride in a solvent such as dimethylformamide to yield an aldehyde of Formula IIIb. The conversion of the aldehyde of Formula IIIb to the corresponding compound of Formula I is carried out using a reducing agent such as lithium aluminum hydride in a solvent such as tetrahydrofuran. There is no particular critical temperature for conducting the reaction, and it can be conducted at room temperature or below or above room temperature. Conveniently, the reaction may be conducted at reflux temperatures.

An alternate method of preparing the compound of Formula I, wherein R is methoxy, comprises the methylation of 8 - benzyloxy - 6,7 - dimethoxy-1,2,3,4-tetrahydroisoquinoline (which can be prepared according to A. Brossi et al., Helv. Chem. Acta, 47 2089–2098 (1964)) to yield 8 - benzyloxy - 6,7 - dimethoxy-2-methyl-1,2,3,4-tetrahydroisoquinoline. The methylation can be conveniently effected by reaction with formic acid and paraformaldehyde to yield the desired end product.

The starting materials of Formula II, i.e., 8-hydroxy-7 - methoxy - 1,2,3,4 - tetrahydroisoquinoline also known as 1,2,3,4 - tetrahydro - 7 - methoxy-8-isoquinolinol and 8 - hydroxy - 6,7 - dimethoxy-1,2,3,4-tetrahydroisoquinoline also known as 1,2,3,4 - tetrahydro - 6,7 - dimethoxy-8-isoquinolinol are known compounds. The products of Formula I are recovered by conventional means. Furthermore, the resulting products, after conversion to acid addition salts, can be purified by conventional means, such as recrystallization.

The compounds of Formula I form pharmaceutically acceptable addition salts with, for example, both pharmaceutically acceptable organic and inorganic acids, such as, acetic acid, succinic acid, formic acid, p-toluene-sulfonic acid, hydrochloric acid, nitric acid, phosphoric acid, sulfuric acid and the like.

The compounds of Formula I, useful as hypotensives, can be incorporated into standard pharmaceutical dosage forms, for example, they are useful for oral or parenteral application with the usual pharmaceutical adjuvant materials, e.g., organic or inorganic inert carrier materials such as water, gelatin, lactose, starch, magnesium stearate, talc, vegetable oils, gums, polyalkylene glycols and the like. The pharmaceutical preparations can be employed in a solid form, e.g., as tablets, troches, suppositories or as capsules, or in liquid form, e.g., as solutions, suspensions or as emulsions. The pharmaceutical adjuvant material can be added and include preservatives, stabilizers, wetting or emulsifying agents, salts to change the osmotic pressure or to act as buffers. They can also contain other therapeutically active materials.

The quantity of active medicament which is present in any of the above-described dosage forms is variable. It is preferred, however, to provide capsules or tablets containing from about 10 mg. to about 50 mg. of the Formula I base, or an equivalent amount of a pharmaceutically acceptable acid addition salt thereof. For parenteral administration, it is preferred to provide a solution containing from about 1 mg./ml. to about 10 mg./ml. of the Formula I base, or an equivalent amount of a pharmaceutically acceptable acid addition salt thereof.

The frequency with which any such dosage form will be administered to a host will vary depending upon the quantity of active medicament present therein and the needs and requirements of the host, as diagnosed by the prescribing practitioner. Under ordinary circumstances, however, from about 1 mg./kg. to about 5 mg./kg. of the compound can be administered daily in several dosages. It is to be understood, however, that the dosages set forth herein are exemplary only and they do not, to any extent, limit the scope or practice of this invention.

The following non-limiting examples further illustrate the invention. All parts are by weight and all temperatures are in degrees centigrade, unless otherwise mentioned.

EXAMPLE 1

Preparation of 2-formyl-1,2,3,4-tetrahydro-7-methoxy-8-isoquinolinol

To a solution of 21.57 g. (0.1 mole) of 1,2,3,4-tetrahydro-7-methoxy-8-isoquinolinol hydrochloride in two liters of methanol were added 227 ml. of an ethanolic sodium ethoxide solution containing 6.8 g. (0.1 mole) of sodium ethoxide. The solvent was removed under reduced pressure and the solid residue was suspended in 800 ml. of a mixture of ethanol-methylene chloride (1:1). After stirring for 30 minutes under nitrogen, the insoluble material was removed by filtration under nitrogen, and the filtrate was evaporated to dryness under reduced pressure. The solid free base thus obtained was added to a stirred mixture of 40 ml. of formic acid (98–100%) and 30 ml. of triethylamine. After completion of the addition, the mixture was stirred at 100–110° overnight and then evaporated to ca. 40–50 ml. of volume under reduced pressure. Addition of water to the oily residue produced 15.9 g. of a crystalline precipitate, M.P. 175–177°. Recrystallization from methanol gave 13 g. (63%) of 2-formyl - 1,2,3,4 - tetrahydro - 7-methoxy-8-isoquinolinol, M.P. 177–179°.

EXAMPLE 2

Preparation of 8-benzyloxy-2-formyl-7-methoxy-1,2,3,4-tetrahydroisoquinoline

To a solution of 26.5 g. (0.128 mole) of 2-formyl-1,2,3,-4-tetrahydro-7-methoxy-8-isoquinolinol in one liter of methanol were added 291 ml. of a solution of sodium ethoxide in ethanol containing 8.7 g. (0.128 mole) of sodium ethoxide. The mixture was allowed to stand at room temperature for 1 hour and thereafter the solvent was removed under reduced pressure. In order to assure dryness of the solid residue, approximately 200 ml. of benzene were added to the residue and removed under reduced pressure. This procedure was repeated twice more. The dry residue then was suspended in 750 ml. of distilled dimethylformamide, and 147 ml. of benzyl chloride were added thereto. The mixture was stirred at 100° for 40 hours. After removing the solvents under a pressure of 1 mm., the residue was suspended in 400 ml. of benzene, and the insoluble parts were removed by filtration. The filtrate was evaporated to dryness under reduced pressure to give 37.4 g. of 8-benzyloxy-2-formyl-7-methoxy-1,2,3,4-tetrahydroisoquinoline as a brown oil, which was used for the next step without further purification.

EXAMPLE 3

Preparation of 8-benzyloxy-7-methoxy-2-methyl-1,2,3,4-tetrahydroisoquinoline hydrochloride To a cooled solution of 37.4 g. of crude 8-benzyloxy-2-formyl-7-methoxy-1,2,3,4-tetrahydroisoquinoline in 1.3 liters of freshly purified tetrahydrofuran were added cautiously 9.5 g. of lithium aluminum hydride in small portions through a wide-mouth polyethylene funnel. Upon completion of the addition, the mixture was refluxed with stirring overnight. To the cooled mixture was added dropwise a saturated aqueous solution of sodium sulfate until the hydrogen evolution ceased. After adding solid sodium sulfate the mixture was filtered and the filtrate evaporated to dryness under reduced pressure. The residue was dissolved in 100 ml. of methanol, and excess isopropanolic acid was added. Upon addition of ether to the solution a crystalline precipitate was formed which was collected by filtration to give 23.5 g. (58%) of 8-benzyloxy-7-methoxy - 2 - methyl-1,2,3,4-tetrahydroisoquinoline hydrochloride, M.P. 185–188°. After recrystallization from methanol, the product had a M.P. of 191–192.5°.

EXAMPLE 4

Preparation of 8-benzyloxy-6,7-dimethoxy-2-methyl-1,2,3,4-tetrahydroisoquinoline A solution of 606 mg. (1.8 mmoles) of 8-benzyloxy-6,7 - dimethoxy-1,2,3,4-tetrahydroisoquinoline hydrochloride in 100 ml. of methanol was treated with 97 mg. (1.8 mmoles) of sodium methylate and evaporated. The residue was extracted twice with 100 ml. portions of ether, and the ether solutions were dried over sodium sulfate and evaporated to give 549 mg. of oily base. This material was dissolved in 15 ml. of methanol and added to 815 mg. (17.5 mmoles) of 98–100% formic acid and 247 mg. (8.2 mmoles) of paraformaldehyde. Thereafter, the mixture was heated in an open flask on the steambath. After 15 minutes, the solvent evaporated, and the residue was heated for 30 minutes longer.

A solution of the clear yellow liquid residue in about 60 ml. of 1 N sodium hydroxide was extracted three times with 100 ml. portions of ether. The ether layers were washed twice with 50 ml. portions of water, dried over sodium sulfate, and evaporated to give 562 mg. of oily free base. A solution of this base in 50 ml. of methanol was acidified with ethanolic hydrogen chloride and evaporated to give 711 mg. of crude product, which was crystallized twice from methanol-ether to give 353 mg. of white, crystalline hydrochloride, M.P. 191–191.5°.

EXAMPLE 5

Capsules of the following composition are prepared as described below:

| | Mg. per capsule |
|---|---|
| 8-benzyloxy - 6,7 - dimethoxy-2-methyl-1,2,3,4-tetrahydroisoquinoline hydrochloride | 50 |
| Lactose, U.S.P. | 125 |
| Corn starch, U.S.P. | 30 |
| Talc, U.S.P. | 5 |
| Total weight | 210 |

Fifty parts of 8-benzyloxy-6,7-dimethoxy-2-methyl-1,2,3,4-tetrahydroisoquinoline hydrochloride were mixed with 125 parts of lactose and 30 parts of corn starch in a suitable mixer. The mixture was further blended by passing through a Fitzpatrick Comminuting Machine with a No. 1A screen with knives forward. The blended powder was returned to the mixer, and 5 parts of talc were added and blended thoroughly. The mixture was filled into No. 4 hard shell gelatin capsules on a Parke Davis capsulating machine.

EXAMPLE 6

Capsules of the following composition are prepared as described below:

| | Mg. per capsule |
|---|---|
| 8 - benzyloxy - 6,7-dimethoxy-2-methyl-1,2,3,4-tetrahydroisoquinoline hydrochloride | 25 |
| Lactose | 158 |
| Corn starch | 37 |
| Talc | 5 |
| Total weight | 225 |

Twenty-five parts of 8-benzyloxy-6,7-dimethoxy-2-methyl - 1,2,3,4 - tetrahydroisoquinoline hydrochloride were mixed with 158 parts of lactose and 37 parts of corn starch in a suitable mixer. The mixture was further blended by passing through a Fitzpatrick Comminuting Machine with a No. 1A screen with knives forward. The blended powder was returned to the mixer and 5 parts of talc were added and blended thoroughly. The mixture was then filled into No. 4 hard shell gelatin capsules on a Parke Davis capsulating machine or any similar type machine.

EXAMPLE 7

Tablets of the following composition are prepared as described below:

| | Mg. per tablet |
|---|---|
| 8 - benzyloxy - 6,7 - dimethoxy-2-methyl-1,2,3,4-tetrahydroisoquinoline hydrochloride | 10.0 |
| Lactose | 113.5 |
| Corn starch | 70.5 |
| Pregelatinized corn starch | 8.0 |
| Calcium stearate | 3.0 |
| Total weight | 205.0 |

Ten parts of 8 - benzyloxy - 6,7-dimethoxy-2-methyl-1,2,3,4-tetrahydroisoquinoline hydrochloride were mixed with 113.5 parts of lactose, 70.5 parts of corn starch and 8 parts of pregelatinized corn starch in a suitable size mixer. The mix was passed through a Fitzpatrick Comminuting Machine fitted with No. 1A screen with knives forward. The mix was returned to the mixer and moistened with water to a thick paste. The moist mass was passed through a No. 12 screen and the moist granules were dried on paper-lined trays at 43°. The dried granules were returned to the mixer, and 3 parts of calcium stearate were added and mixed well. The granules were compressed at a tablet weight of 205 mg., using standard concave punches having a diameter of 5/16".

EXAMPLE 8

Tablets of the following composition are prepared as described below:

| | Mg. per tablet |
|---|---|
| 8 - benzyloxy - 6,7 - dimethoxy - 2-methyl-1,2,3,4-tetrahydroisoquinoline hydrochloride | 25.00 |
| Lactose, U.S.P. | 64.50 |
| Corn starch | 10.00 |
| Magnesium stearate | 0.50 |

Twenty-five parts of 8-benzyloxy-6,7-dimethoxy-2-methyl - 1,2,3,4 - tetrahydroisoquinoline hydrochloride were mixed with 64.5 parts of lactose, 10 parts of corn starch and 0.5 part of magnesium stearate in a suitable mixer. The mixture was further blended by passing through a Fitzpatrick Comminuting Machine fitted with a No. 1A screen with knives forward. The mixed powders were slugged on a tablet compressing machine. The slugs were comminuted to a suitable mesh size (No. 16 screen) and mixed well. Thereafter, the tablets were compressed at a tablet weight of 100 mg. using tablet punches having a diameter of approximately ¼". (Tablets may be either flat or biconvex and may be scored if desired.)

EXAMPLE 9

Suppositories of the following composition are prepared as described below:

| | Gm. per 1.3 gm. suppository |
|---|---|
| 8 - benzyloxy - 6,7 - dimethoxy - 2 - methyl-1,2,3,4-tetrahydroisoquinoline hydrochloride | 0.025 |
| Hydrogenated coconut oil | 1.230 |
| Carnauba wax | 0.045 |

123 parts of hydrogenated coconut oil (Wecobee M—E. F. Drew Company, New York, N.Y.) and 4.5 parts of carnauba wax were melted in a suitable size glass lined container (stainless steel may also be used), mixed well and cooled to 45°. 2.5 parts of 8-benzyloxy-6,7-dimethoxy - 2 - methyl-1,2,3,4-tetrahydroisoquinoline hydrochloride, which had previously been reduced to a fine powder with no lumps, were added and stirred until completely and uniformly dispersed. The mixture was poured into suppository molds to yield suppositories having an individual weight of 1.3 gms. The suppositories were cooled and removed from molds. They were individually wrapped in wax paper for packaging. (Foil may also be used.)

EXAMPLE 10

The compounds of Formula I of the present invention have shown useful hypotensive or blood pressure lowering activity in animals.

A dog was nembutalized (30 mg./kg. i.v.) Respiration (rate and amplitude) and blood pressure were recorded on a smoked graph. A control series of compounds was administered intravenously and the results recorded on the graph. The control compounds used were norepinephrine (1 γ/kg.), serotonin (25 γ/kg.) hypertensine (0.5 γ/kg.) and histamine (10 γ/kg.). In addition, response to carotid artery occlusion and to the electrical stimulation (5 v. for 10 seconds) of the central portion of the severed vagus nerve were recorded. There was a five-minute interval between each of the control drugs and physiological procedures. Five minutes after the central vagus stimulation, a compound of Formula I was administered at 4 mg./kg. i.v., and the results were recorded. The experimental control procedures were run again to check that the blood pressure and respiratory reactions were similar to the controls given before the test drug was administered. If they were similar, the second drug was administered. If they were not, the procedure was delayed for 15 minutes, and then the controls were run again.

The results are given in Table I below:

TABLE I

| Compound | Dose, mg./kg. | Blood pressure change, mm. Hg |
|---|---|---|
| 8-benzyloxy-6,7-dimethoxy-2-methyl-1,2,3,4-tetrahydroisoquinoline | 4 | −6 |
| 8-benzyloxy-7-methoxy-2-methyl-1,2,3,4-tetrahydroisoquinoline | 4 | −35 |

We claim:
1. A compound of the formula

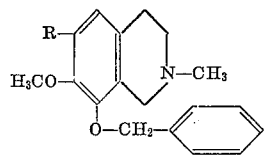

(I)

wherein R is selected from the group consisting of hydrogen and methoxy, and pharmecutically acceptable acid addition salts thereof.

2. A compound in accordance with claim 1, 8-benzyloxy-7-methoxy-2-methyl-1,2,3,4-tetrahydroisoquinoline.

3. A compound in accordance with claim 1, 8-benzyloxy-7-methoxy-2-methyl - 1,2,3,4 - tetrahydroisoquinoline hydrochloride.

4. A compound in accordance with claim 1, 8-benzyl-6,7-dimethoxy-2-methyl-1,2,3,4-tetrahydroisoquinoline.

5. A compound in accordance with claim 1, 8-benzyl-6,7-dimethoxy-2-methyl-1,2,3,4-tetrahydroisoquinoline hydrochloride.

6. A compound of the formula

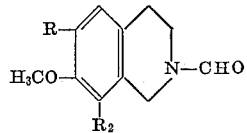

(III)

wherein R is selected from the group consisting of hydrogen and methoxy, and $R_2$ is selected from the group consisting of hydroxy and benzyloxy.

7. A compound in accordance with claim 6, 2-formyl-8-hydroxy-7-methoxy-1,2,3,4-tetrahydroisoquinoline.

8. A compound in accordance with claim 6, 2-formyl-8-benzyloxy-7-methoxy-1,2,3,4-tetrahydroisoquinoline.

References Cited

UNITED STATES PATENTS

| | | | |
|---|---|---|---|
| 2,700,041 | 1/1955 | Weston | 260—289 |
| 3,009,918 | 11/1961 | Openshaw et al. | 260—287 X |
| 3,217,007 | 11/1965 | Brossi et al. | 260—287 |

OTHER REFERENCES

Brossi et al.: Helv. Chem. Acta., vol. 47, p. 2089–98 (1964).

DONALD G. DAUS, Primary Examiner

U.S. Cl. X.R.

424—258; 260—287, 289

PO-1050
(5/69)

UNITED STATES PATENT OFFICE
CERTIFICATE OF CORRECTION

Patent No. 3,501,478               Dated   March 17, 1970

Inventor(s)   GUENTER GRETHE and FAUSTO EUGENIO SCHENKER

It is certified that error appears in the above-identified patent and that said Letters Patent are hereby corrected as shown below:

Column 6, line 74   "8-benzyl-"   should be:

8-benzyloxy-

Column 7, line 1   "8-benzyl-"   should be:

8-benzyloxy-

SIGNED AND
SEALED
NOV 10 1970

(SEAL)
Attest:

Edward M. Fletcher, Jr.
Attesting Officer

WILLIAM E. SCHUYLER, JR.
Commissioner of Patents